United States Patent
Masuda et al.

[11] Patent Number: 5,820,204
[45] Date of Patent: Oct. 13, 1998

[54] BODY STRUCTURE FOR A MOTOR VEHICLE

[75] Inventors: Toshio Masuda, Ashikaga; Masayuki Honma, Ora, both of Japan

[73] Assignee: Fuji Jukogyo Kabushiki Kaisha, Tokyo, Japan

[21] Appl. No.: 767,295

[22] Filed: Dec. 16, 1996

Related U.S. Application Data

[63] Continuation of Ser. No. 510,503, Aug. 2, 1995, abandoned.

[30] Foreign Application Priority Data

Aug. 31, 1994 [JP] Japan .................................. 6-230465

[51] Int. Cl.⁶ .................................................. B62D 25/20
[52] U.S. Cl. ........................ 296/188; 296/189; 296/204; 296/209
[58] Field of Search .................................. 296/188, 189, 296/203, 204, 205, 209

[56] References Cited

U.S. PATENT DOCUMENTS

| | | | |
|---|---|---|---|
| 1,602,913 | 10/1926 | Leipert | 296/29 |
| 2,301,593 | 11/1942 | Ulrich | 280/788 |
| 2,380,523 | 7/1945 | Hicks et al. | 296/204 |
| 4,068,884 | 1/1978 | Watanabe et al. | 296/204 |
| 4,081,197 | 3/1978 | Ackel | 296/204 |
| 4,470,619 | 9/1984 | Imajyo et al. | 280/808 |
| 4,514,008 | 4/1985 | Watanabe et al. | 296/204 |
| 4,572,571 | 2/1986 | Malen | 296/204 X |
| 4,747,636 | 5/1988 | Harasaki et al. | 296/186 |
| 4,892,350 | 1/1990 | Kijima | 296/204 |
| 4,934,751 | 6/1990 | Shimoda | 296/188 |
| 5,042,872 | 8/1991 | Yoshii | 296/209 X |
| 5,213,386 | 5/1993 | Janotik et al. | 296/29 |
| 5,246,264 | 9/1993 | Yoshii | 296/203 |

FOREIGN PATENT DOCUMENTS

| | | | |
|---|---|---|---|
| 1800778 | 10/1970 | Germany | 296/203 |
| 3119666 | 1/1982 | Germany | 296/203 |
| 62-39375 | 2/1987 | Japan | 296/209 |
| 62-125956 | 6/1987 | Japan | 296/204 |
| 62-258868 | 11/1987 | Japan | 296/209 |
| 2-283578 | 11/1990 | Japan | 296/209 |
| 4-215574 | 8/1992 | Japan | 296/209 |
| 5-185960 | 7/1993 | Japan | 296/209 |
| 6-211164 | 8/1994 | Japan | 296/203 |
| 6-263062 | 9/1994 | Japan . | |
| 1356112 | 6/1974 | United Kingdom . | |

OTHER PUBLICATIONS

JPO & amp; JAPIO, English Abstract of Japanese Patent 6–270845 dated 1994.
JPO & amp; JAPIO, English Abstract of Japanese Patent 6–263062 dated 1994.
JPO & amp; JAPIO, English Abstract of Japanese Patent 2–141372 dated 1990.
JPO & amp; JAPIO, English Abstract of Japanese Patent 60–259577 dated 1985.
JPO & amp; JAPIO, English Abstract of Japanese Patent 5–97057 dated 1993.
JPO & amp; JAPIO, English Abstract of Japanese Patent 6–211167 dated 1994.

*Primary Examiner*—Andrew C. Pike
*Attorney, Agent, or Firm*—Beveridge, DeGrandi, Weilacher & Young, LLP

[57] ABSTRACT

A body structure of a motor vehicle includes a roof side rail, a side sill, a center pillar, a floor, a center tunnel, and a doubler provided between the side sill and the center tunnel. The doubler has a flat closed cross section formed by the floor and a plurality of U-shaped channels and its lengthwise width is longer than that of the lower end of the center pillar. At the outer end of the doubler there are provided a pillar mating section and a side sill mating section. The doubler is connected by welds at the pillar mating section with the center pillar at the side sill mating section with the side sill. The center pillar has a yieldable portion thereon and it can absorb an impact energy by bending with respect to itself. The center tunnel has a reinforcement panel reinforced from underneath.

14 Claims, 4 Drawing Sheets

BODY STRUCTURE FOR A MOTOR VEHICLE

This is a continuation of application Ser. No. 08/510,503 filed Aug. 2, 1995, now abandoned.

BACKGROUND OF THE INVENTION

1. Field of the Invention

The present invention relates to a body structure of a motor vehicle, in particular to structures of a center pillar and a floor.

2. Prior Art

Generally, as shown in FIG. 8, a center pillar "a" is constituted by a enter pillar inner panel and a center pillar outer panel which form together a closed cross section thereof. Further the center pillar is connected at the lower end thereof with a side sill "b" having a hollow section extending longitudinally and is connected at the upper end thereof with a roof side rail having a closed cross section extending longitudinally. Further the side sill is fixedly connected at the inner side thereof with a floor "c" and a cross member "d" is provided transversely on a floor "c". The end portion of a cross member "d" is connected at the connecting portion of the center pillar with the inner side of the side sill "b".

As an example of the improvement of the center pillar constituted above, there is a Japanese Utility Application No. Jitsu-Kai-Sho 61-7473 which discloses as shown with a broken line of FIG. 8 a technique that the end portion of cross member "d" is connected through a bracket "d'" with the lower end of the center pillar "a" so as to transfer a load applied to the lower portion of the center pillar to the cross member with high rigidity for the purpose of enhancing the entire rigidity of the vehicle body.

Further, generally, since the center pillar is located adjacent to an operator or a passenger on the front seat, the manner of deformation of the center pillar toward the inside of the vehicle has a great influence on injury to the passenger or operator in the event of a side impact. That is, in most vehicles, the center pillar is constituted by a thick part (having a large cross section) at the lower portion below the window line and a thin part (having a small cross section) at the upper portion above the window line and the cross section thereof is largely changed at the border of the lower and upper portions. Because of this construction, it is possible that the center pillar bends near that border at the middle of the center pillar when the vehicle is subjected to a side impact. In this case, since the bending occurs at the middle portion of the center pillar, as shown in FIG. 10, a large amount of deformation thereof is caused toward the inside of the vehicle and as a result there is a likelihood that the passenger is seriously injured.

In order to avoid this disadvantage, the assignee hereof of the present invention has proposed an improved center pillar in Japanese Utility Model Application No. Jitsu-Gan-Hei 5-20244. In this prior art there is intentionally provided a strength discontinuity portion 1a, i.e., a portion easy to bend when a side force is applied thereto, at the lower part of the center pillar as shown in FIG. 9. At the initial stage of side impact only the strength discontinuity portion (referred to a yieldable portion hereinafter) 1a bends and the upper portion of the center pillar does not. As a result, the center pillar is deformed toward the inside of the vehicle with the original configuration almost retained and the amount of deformation is relatively small, whereby an impact on the passenger can be minimized.

In order that the center pillar according to this utility model application to bend at the yieldable portion 1a and is deformed as intended in the event of side impact, the upper and lower ends of the center pillar, specifically the lower end portion thereof, must withstand an impact load. Therefore, since the aforementioned reinforcement member bracket "d'" is just connected with the lower end of the center pillar, it is insufficient to positively support the impact load.

Further, according to this prior art, when a side impact is applied, first the impact load is transferred to a center tunnel through the cross member d and the floor c. Since the center tunnel is relatively weak against the transversal force, although it is strong against the longitudinal force, the center tunnel is collapsed before the center pillar and the side sill is collapsed. That is to say, the whole member of the center pillar and the side sill is deformed toward the inside of the vehicle and the impact energy can not be absorbed effectively.

SUMMARY OF THE INVENTION

Accordingly, the present invention is intended to obviate the abovementioned disadvantage of the prior art and it is summarized as follows.

It is an object of the present invention to provide a body structure capable of protecting the occupants from a serious injury in the event of a side impact.

It is a further object of the present invention to provide a vehicle body capable of absorbing a large impact energy by a simple structure.

A body structure of a motor vehicle has a roof side rail, a side sill composed of a side sill inner panel and a side sill outer panel, a center pillar connected at an upper end thereof with the side rail and connected at a lower end thereof with the side sill, a center tunnel, and a floor. Further the center pillar includes an center pillar inner panel and a center pillar outer panel.

In particular, the body structure according to the present invention includes:

a doubler connected by welds at an outer end thereof with the side sill and the center pillar and further connected by welds at an inner end thereof with the center tunnel, the doubler including a flat closed cross section and a lengthwise width longer than a lengthwise width of the lower end of the center pillar;

a pillar mating section integrally formed with the outer end of the doubler, the pillar mating section welded to the lower end of the center pillar inner panel such that the pillar mating portion covers the lower end of the center pillar inner panel;

a side sill mating section integrally formed with the outer end of the doubler, the side sill mating section welded to the side sill inner panel;

a yieldable portion of the center pillar where the center pillar is easy to bend toward the inside of the motor vehicle in the event of a side impact; and a tunnel reinforcement connected by mechanical fasteners with the center tunnel from underneath so as to form a closed cross section therein.

DETAILED DESCRIPTION OF THE PREFERRED EMBODIMENTS

Embodiments according to the present invention will be described in detail by referring to the accompanying drawings.

Figure 4:
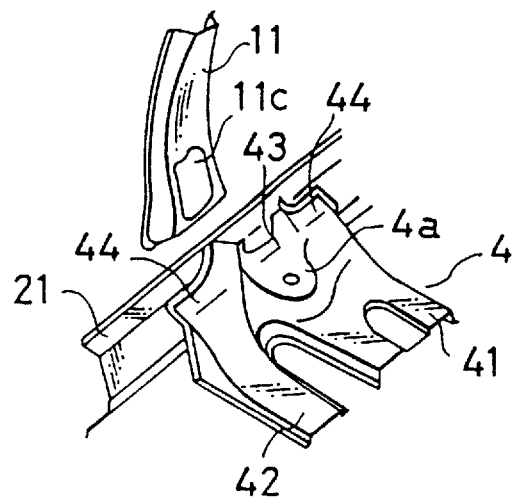
FIG. 4 is an exploded view of the section depicted in FIG. 2.

Referring now to FIG. 4, numeral 1 denotes a center pillar comprising a center pillar inner panel 11 and a center pillar outer panel 12. As seen in FIG. 4, the center pillar inner panel 11 forms a closed end for the center pillar 1 below an anchoring hall 11c. The center pillar 1 forms a closed cross section in which a reinforcement (not shown) is provided to reinforce the center pillar itself. The center pillar 1 is connected at the upper end thereof with a roof side rail 3 and at the lower end thereof with a side sill 2. At a predetermined position of the lower part of the center pillar 1 there is provided with a strength discontinuity portion or a yieldable portion 1a which is easy to be bent by the input force in the lateral direction of the vehicle. The above yieldable portion is located for example at an intermediate position of upper and lower door hinges 9a, 9b or at a position near the lower door hinge 9b. When a side impact is provided on the center pillar 1, the center pillar 1 bends around that yieldable portion 1a toward the inside of the vehicle; thus an upper half of the center pillar 1 higher than the middle portion thereof moves uniformly inside without being subjected to a deformation. The yieldable portion of the center pillar is formed for example by intentionally providing a portion lacking a reinforcement member between the upper half and the lower half of the center pillar, as disclosed in the aforementioned utility model application No. Jitsu-Gan-Hei 5-20244.

The side sill 2 comprises a side sill inner panel 21, a side sill outer panel 22, and a side sill reinforcement 23 and these form a closed cross section. Further, the roof side rail 3 comprises an inner panel and an outer panel, forming a closed cross section too.

Figure 7:
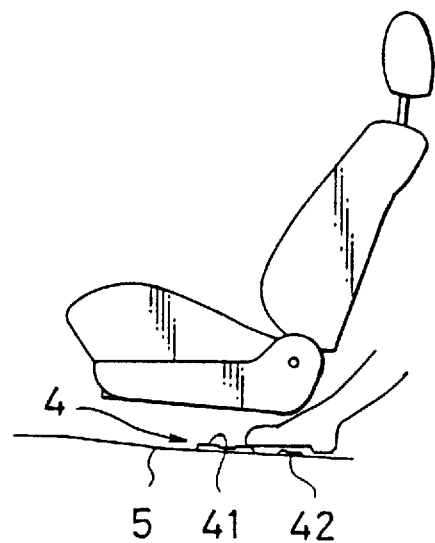
FIG. 7 is a sectional elevation of a doubler in accordance with the invention.
Figure 8:
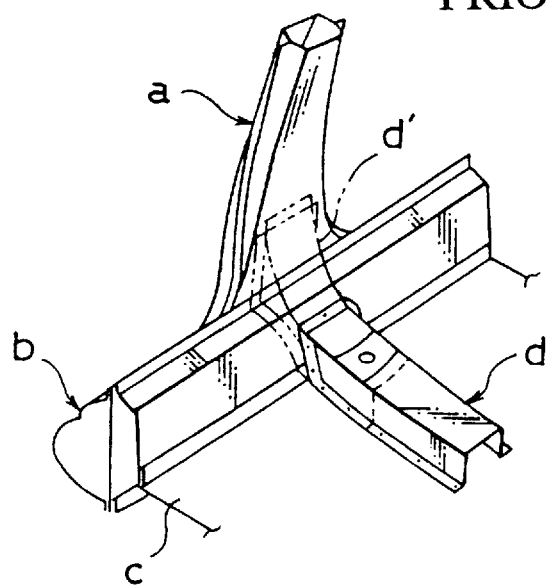
FIG. 8 is a perspective view of a PRIOR ART connecting portion of a center pillar and side sill.
Figure 9:
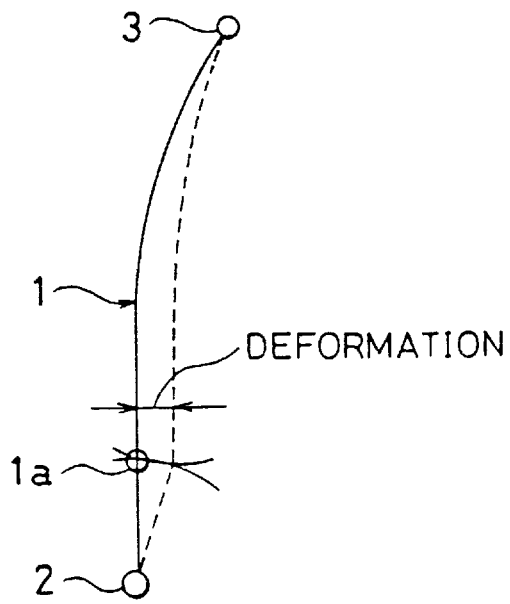
FIG. 9 is a representation of center pillar deformation according to the present invention.
Figure 10:
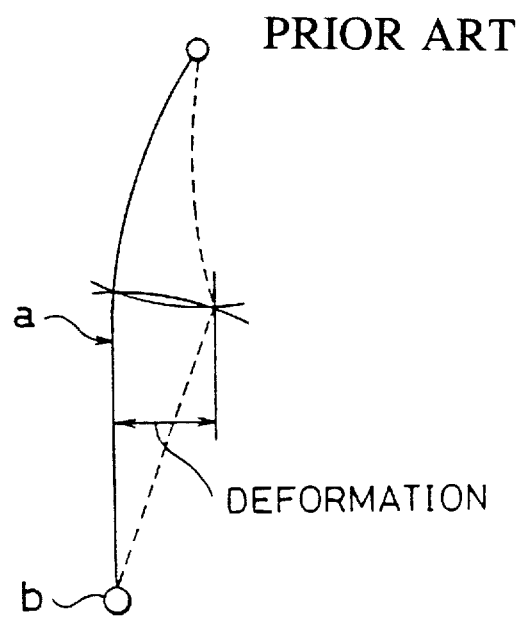
FIG. 10 is a representation of center pillar deformation according to the PRIOR ART.

Numeral 4 denotes a doubler fixed on a floor 5 and it forms a closed cross section in the transverse direction of the vehicle. The doubler 4 has a larger width D than a width d of a connecting portion of the center pillar 1 with the side sill 2. In this embodiment the doubler 4 is composed of a front member 41 comprising two U-shaped channels and a rear member 42 comprising one U-shaped channel, forming two closed cross sections in the transverse direction of the vehicle with the floor 5. These front and rear members 41 and 42 are combined integrally at the outer end of the doubler 4 and the integral portion thereof is bent upward in a circular arc and covers the entire portion of the lower end of the center pillar 1. The integral portion of the doubler 4 is welded to the center pillar 1 at a pillar mating section 43 and welded to the side sill 2 at a side sill mating section 44. The pillar mating section 43 forms an area or a space in which to nest the center pillar inner panel 11 of the center panel 1. Thus the center pillar 1 is able to rest within the pillar mating section 43. Further, at the bottom of the circular arc of the doubler 4 there is provided a mounting boss 4a for mounting a front seat. The end of the doubler 4 at the center side of the vehicle is butt-welded to a center tunnel 5a. The height of the U-shaped channel of the rear member 42 is determined low enough so as not to hinder the passenger's feet as illustrated in FIG. 7. Further, since the necessary strength of the doubler 4 according to this embodiment is secured by increasing the cross section area by broadening the width of the doubler 4, the height of the U-shaped channel of the front member 41 can be lowered at a level not hindering the passenger's feet.

Figure 3:
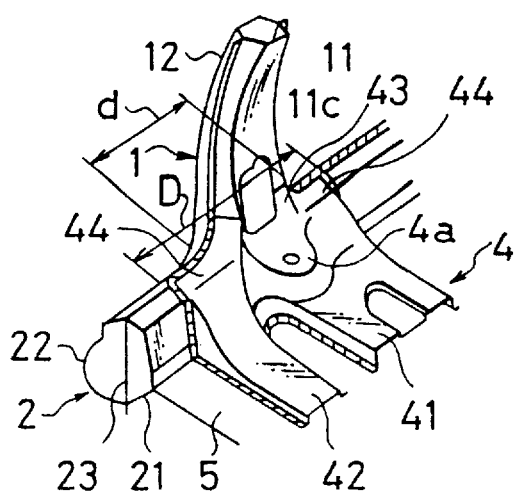
FIG. 3 is a perspective view of the section depicted in FIG. 2.

The side sill mating section 44 is located on the front and rear sides of the pillar mating section 43 along the side sill 2. The difference between the widths of the side sill mating section and the pillar mating section is D–d as shown in FIG. 3. The difference D–d is greater than two times a distance between the upper surface of the side sill and a top of the upper end portion of the doubler.

Numeral 6 is a tunnel reinforcement by which a closed cross section is provided in the center tunnel 5a. The tunnel reinforcement 6 also acts as connecting the left and right doublers 4, 4. That is, in an assembly process left and right brackets 6a, 6b are welded to the left and right doublers 4, 4 respectively and a left and right ends of the tunnel reinforcement 6 are fastened to the left and right doublers 4, 4 through the bolts mounted on the left and right brackets 6a, 6b respectively.

Figure 1:
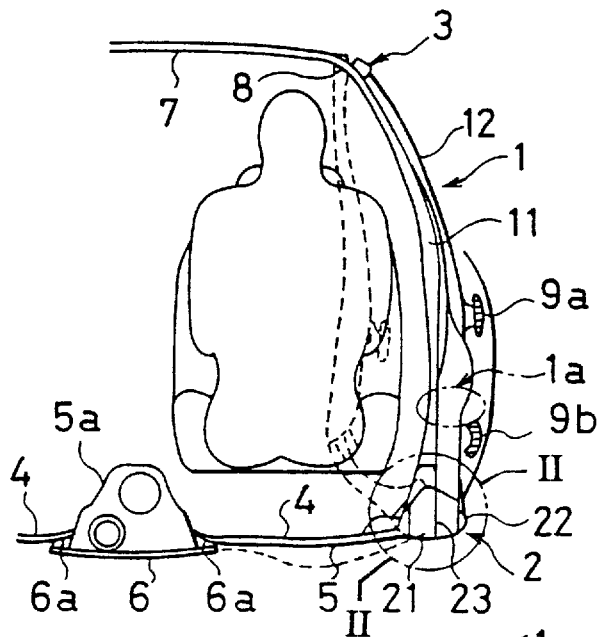
FIG. 1 is a diagrammatic representation showing a first embodiment according to the present invention including a sectional view of a central pillar in accordance with the first embodiment.
Figure 2:
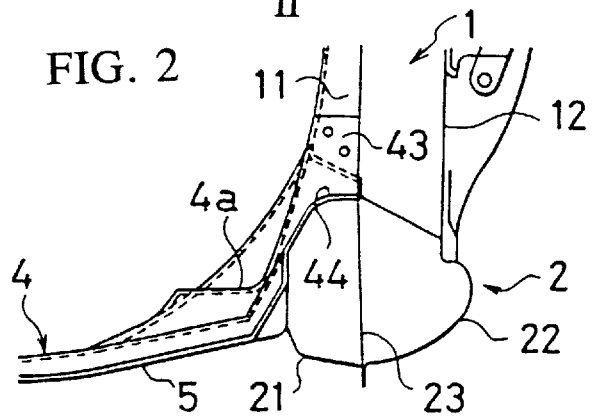
FIG. 2 is an expanded sectional view of the section designated II in FIG. 1.

Further, referring to FIG. 1a, numeral 7 denotes a roof brace center which forms a closed cross section and the outer end of the roof brace center 7 is connected with the upper end of the center pillar 1 by a connecting member 8.

When a vehicle has a side impact by an another vehicle, the front bumper of the other vehicle crushes into near the lower portion of the center pillar 1 of the vehicle. Then, the center pillar 1 bends toward the inside of the vehicle around the yieldable portion 1a provided at the predetermined height of the center pillar 1 while the upper portion thereof moves inside with its original configuration retained, whereby injury to the occupants can be greatly alleviated. In this case, whether the predetermined yieldable portion of the center pillar 1 yields or not is dependent upon the strength of the lower end portion of the center pillar 1 and the one of the center tunnel 5a, as described before.

Figure 5:
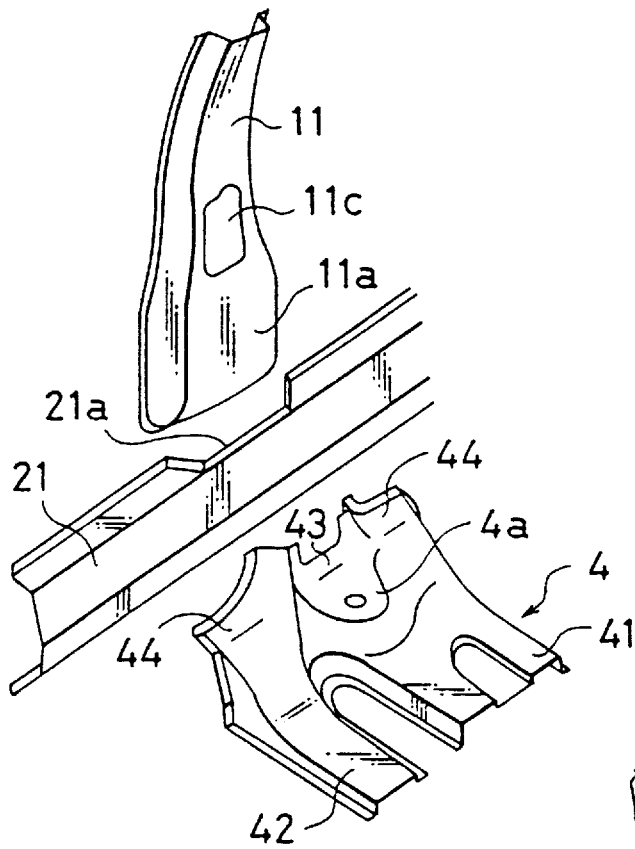
FIG. 5 is a diagrammatic view of a second embodiment according to the invention depicting an exploded perspective view of the lower portion of the center pillar, side sill, and doubler side end of the second embodiment.
Figure 6:
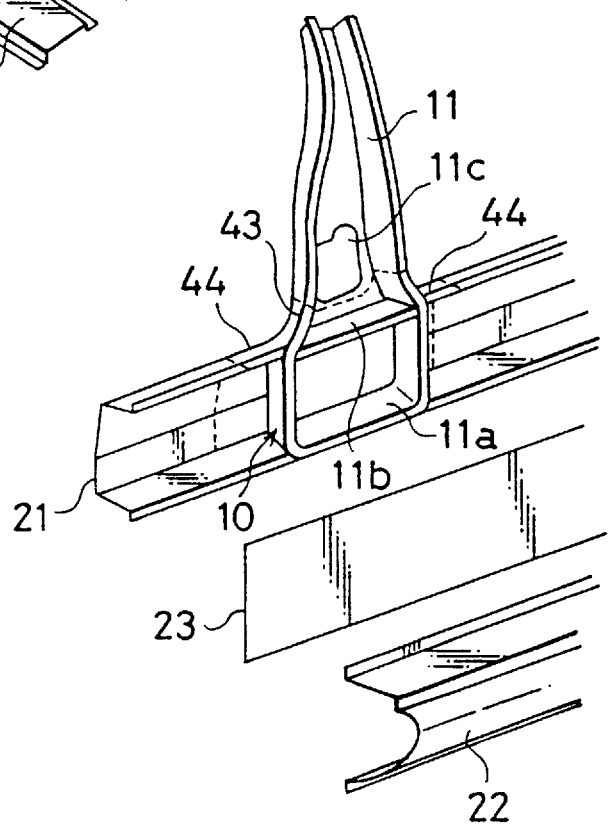
FIG. 6 is an exploded perspective view of a center pillar of the embodiment illustrated in FIG. 5.

FIGS. 5–6 show a second embodiment of the present invention wherein a crash box 10 is provided at the connecting portion of the center pillar 1 and the side sill 2. The crash box 10 acts as making the absorption of the impact energy more effective in addition to enhancing strength and rigidity of the connecting portion.

According to the second embodiment, a box-like section 11a separated by a separator 11b is formed integrally at the lower end of the center pillar inner panel 11. The lateral side walls of the center pillar inner panel 11 form internal walls to separate the crash box 10 from the side sill inner panel 21. The box-like section 11a is fitted in a notch 21a provided in the side sill inner panel 21 and welded thereto. Further, the side sill outer panel 22 is put on the side sill inner panel with a side sill reinforcement 23 between and is welded to each other. Thus, a crash box 10 is formed in the closed cross section of the side sill 1. The doubler 4 is connected with the center pillar in the same manner as in the first embodiment shown in FIG. 1. Further, in this embodiment since the yieldable portion 1a of the center pillar 1 and the d tunnel reinforcement 6 are constituted in the same way as in the first embodiment, the impact energy is received firmly by the rigid box structure of the crash box 10 at an initial stage of the side impact and it is continued to be absorbed until the crash box 10 is collapsed, whereby the absorption of the impact energy can be performed further effectively.

In FIGS. 1–6, numeral 11c presents an anchoring hall for anchoring a seat belt retracter. This anchoring hall is employed for convenience of an assembly work of the doubler 4 to the lower portion of the center pillar 1 and further employed for tuning-up the bending strength of the yieldable portion and the lower portion of the center pillar. The anchoring hall 11c provides a cross-sectional change in the center pillar 1 to utilize the concept of a notch effect. The anchoring hall lic is framed at its lower end by the pillar mating section 43. The pillar mating section 43 covers the center pillar inner panel 11 about the anchoring hall 11c.

In summary, according to the present invention, there is provided the doubler having a flat and broad closed cross section, provided transversely on the floor. The inside end of the doubler is connected with the center tunnel which is reinforced by the reinforcement member. The outside end of the doubler is connected with the lower end of the center pillar such that the wide end portion of the doubler covers both the lower end of the center pillar and the side sill. Additionally, there is provided the yieldable portion, namely the portion of strength continuity against a side impact load, near the lower portion of the center pillar. In the body structure thus constituted, when the vehicle has an side impact, initially the impact energy is dispersed broadly to other body structures through the rigid connecting portion of three structure members, the center pillar, the side sill, and the doubler. Finally the center pillar yields at the predetermined portion thereof, thereby effectively absorbing impact energy. Thus, the present invention provides an excellent vehicle body having a simple structure and capable of protecting vehicle operators and passengers from serious injury.

While the presently preferred embodiments of the present invention have been shown and described, it is to be understood that these disclosures are for the purpose of illustration and that various changes and modifications may be made without departing from the scope of the invention as set forth in the appended claims.

what is claimed is:

1. A body structure of a motor vehicle comprising:
    a side sill;
    a center pillar abutting said side sill, said center pillar having an anchoring hall and a lower portion of a selected width;
    a floor;
    a doubler disposed on said floor, said doubler having an outer end provided in a transverse direction of the vehicle and connected at said outer end thereof with said side sill and said center pillar, said doubler including a flat closed cross section and a lengthwise width larger than the selected width of said lower portion of said center pillar;
    a pillar mating section integrally formed with said outer end of said doubler and securely connected with said lower portion of said center pillar such that said pillar mating section covers said lower portion of said center pillar, said pillar mating section nesting said lower portion of said center pillar and framing a portion of said anchoring hall in said center pillar; and
    a side sill mating section integrally formed with said outer end of said doubler and securely connected with said side sill.

2. The body structure according to claim 1, wherein said closed cross section of said doubler is formed by said floor and at least one U-shaped channel.

3. A body structure of a motor vehicle comprising:
    a side sill including a side sill inner panel and a side sill outer panel;
    a center pillar including a center pillar outer panel, a center pillar inner panel forming a closed end of said center pillar, and an anchoring hall in said center pillar inner panel;
    a floor;
    a doubler on said floor, said doubler being connected at an outer end thereof with said side sill and said center pillar, said doubler including a flat closed cross section and a lengthwise width longer than a lengthwise width of said closed end of said center pillar inner panel;
    a pillar mating section integrally formed with said outer end of said doubler and securely connected with said center pillar inner panel such that said pillar mating section covers said center pillar inner panel about said anchoring hall; and
    a side sill mating section integrally formed with said outer end of said doubler, said side sill mating section being connected with said side sill inner panel.

4. A vehicle body comprising:
    a roof side rail extended at an upper side portion of said vehicle body in a longitudinal direction thereof;
    a floor provided at a lower portion of said vehicle body to form a passenger compartment;
    a side sill extended at a lower side portion of said vehicle body in the longitudinal direction thereof;
    a center pillar interposed between said roof side rail and said side sill at an intermediate position of a vehicle length and extended in a vertical direction of said vehicle body;
    a doubler mounted on said floor, extending in a lateral direction of said vehicle body, and connecting with said side sill and said center pillar;
    a pillar mating section formed at an upper end portion of said doubler for covering a lower portion of said center pillar above said side sill; and
    a side sill mating section formed at a front side and a rear side of said pillar mating section for connecting to an upper surface of said side sill;
    wherein said side sill mating section has a greater width (D) in the longitudinal direction of said vehicle body than that (d) of said pillar mating section;
    wherein the greater width (D) provides a lesser cross-sectional height to thereby provide a flattened configuration in order to more easily collapse when said vehicle body is subject to collision with another vehicle from a sideward direction than a middle portion of said center pillar so as to protect a passenger therein by effectively absorbing a shock and to provide augmented room in the passenger compartment; and wherein a difference between the width of said side sill mating section and the width of said pillar mating section is greater than two times a distance between said upper surface of said side sill and a top of said upper end portion of said doubler.

5. The vehicle body according to claim 4, wherein said doubler includes a front member and a rear member where said rear member has a U-shaped cross section.

6. The vehicle body according to claim 5, wherein said doubler has a closed section formed by said U-shaped cross section with said floor.

7. The vehicle body according to claim 4, further comprising:
   a center tunnel formed on said floor at a center portion thereof;
   an inner end of said doubler abutted on a side wall of said center tunnel; and
   a tunnel reinforcement provided to cover said center tunnel and said inner end of said doubler thereunder so as to reinforce said vehicle body.

8. The vehicle body according to claim 4, wherein
   said side sill has a closed box cross section formed by an inner sill and an outer sill with approximately U-shaped cross sections; and
   Wherein said vehicle body further comprises a crash box formed by both lateral side walls of a lower end of said center pillar and by a separator plate interposed between said lateral side walls in line with an upper wall of said inner sill so as to effectively absorb an impact of collision energy.

9. The vehicle body according to claim 4, wherein said center pillar includes a center pillar outer panel and a center pillar inner panel, and said center pillar inner panel provides a closed bottom to said center pillar and said closed bottom abuts said side sill.

10. A vehicle body comprising:
    a roof side rail extended at an upper side portion of said vehicle body in a longitudinal direction thereof;
    a floor provided at a lower portion of said vehicle body to form a passenger compartment;
    a side sill extended at a lower side portion of said vehicle body in the longitudinal direction thereof;
    a center pillar interposed between said roof side rail and said side sill at an intermediate position of a vehicle length and extended in a vertical direction of said vehicle body, said center pillar including a center pillar outer panel and a center pillar inner panel, and said center pillar inner panel providing a closed bottom to said center Pillar and said closed bottom abutting said side sill;
    a doubler mounted on said floor, extending in a lateral direction of said vehicle body, and connecting with said side sill and said center pillar;
    a pillar mating section formed at an upper end portion of said doubler for covering a lower portion of said center pillar above said side sill; and
    a side sill mating section formed at a front side and a rear side of said pillar mating section for connecting to an upper surface of said side sill;
    wherein said side sill mating section has a greater width (D) in the longitudinal direction of said vehicle body than that (d) of said pillar mating section;
    the greater width (D) provides a lesser cross-sectional height to thereby provide a flattened configuration in order to more easily collapse when said vehicle body is subject to collision with another vehicle from a sideward direction than a middle portion of said center Pillar so as to protect a passenger therein by effectively absorbing a shock and to provide augmented room in the passenger compartment;
    said center pillar inner panel has an anchoring hall; and
    said pillar mating section has an area within which to nest said center pillar inner panel below said anchoring hall; and
    whereby a lower portion of said anchoring hall is framed by said pillar mating section.

11. The vehicle body according to claim 10, wherein said anchoring hall is placed in a manner to fine-tune collapsibility of said center pillar.

12. A vehicle body comprising:
    a floor,
    a side sill extending longitudinally along said floor, said side sill having an upper surface,
    a center pillar connected to said side sill and extending in a vertical direction, said center pillar including a center pillar outer panel, a center pillar inner panel abutting said upper surface of said side sill, and an anchoring hall in said center pillar inner panel, said center pillar having a closed end formed by said center pillar inner panel mating with said center pillar outer panel,
    a doubler laterally mounted on said floor and connected to both said side sill and said center pillar,
    a pillar mating section formed at an upper end portion of said doubler nesting said center pillar with said anchoring hall resting in an area formed by said pillar mating section, and
    a side sill mating section formed at a front side and a rear side of said pillar mating section for connecting said doubler to said upper surface of said side sill;
    wherein a longitudinal width of said side sill mating section is larger than a longitudinal width of said pillar mating section,
    a difference between the two longitudinal widths is at least twice as large as a distance between said upper surface of said side sill and a top of said pillar mating section, and
    the longitudinal width of said sill mating section provides a lesser cross-sectional height to thereby provide a flattened configuration in order to more easily collapse when the vehicle body is subject to collision with another vehicle from a sideward direction than a middle, portion of said center pillar so as to protect a passenger therein by effectively absorbing a shock and to provide augmented room in a passenger compartment;
    whereby said anchoring hall is placed in a manner to fine-tune collapsibility of said center pillar.

13. The vehicle body according to claim 12, wherein said doubler includes a front member and a rear member where said rear member has a U-shaped cross section.

14. The vehicle body according to claim 12, further comprising:
    a center tunnel formed on said floor at a center portion thereof;
    an inner end of said doubler abutted on a side wall of said center tunnel; and
    a tunnel reinforcement provided to cover said center tunnel and said inner end of said doubler thereunder so as to reinforce said vehicle body.

* * * * *